Sept. 25, 1956  H. C. NEWMAN  2,764,127
FARROWING STALL
Filed Jan. 14, 1953

INVENTOR.
Hillis C. Newman
BY

2,764,127

FARROWING STALL

Hillis C. Newman, Fremont, Nebr.

Application January 14, 1953, Serial No. 331,293

13 Claims. (Cl. 119—20)

This invention relates to farrowing stalls used in the raising of pigs and during farrowing of sows and more particularly it is an object of my invention to provide an improvement in farrowing stalls. In the past, farrowing stalls have had many disadvantages.

A primary disadvantage has been in that farrowing stalls have not been adjustable for receiving sows of different sizes and it is an object of this invention to provide a farrowing stall adjustable both in length and in width.

A further disadvantage has been in that new-born pigs have become smothered and killed in costly numbers at times when the sow lays down on them in the farrowing stall. It is an object of this invention to eliminate this costly waste by providing a farrowing stall so constructed as to permit the small farrowed pigs to escape from the sides of the stall when they become alarmed instinctively as the sow begins to lay down.

Yet a further object is to provide a stall constructed so that the farrowed pigs are in a sense pushed outwardly of the sides of the stall to safety by the body of the mother sow as she leans against one side of the farrowing stall in the process of sliding downwardly on the side of the stall to lie down on the floor, the body of the sow bumping inclinedly against the farrowed pigs in the stall so as to push the farrowed pigs outwardly through properly placed openings between the floor of the stall and the upwardly spaced lowermost portions of the sides of the stall.

Still another object is to provide a farrowing stall into which sows can be more easily put. In the past farrowing stalls have had fixed widths very little wider than the width of a sow. It has been very difficult and time consuming to force a sow against her will to enter the narrow opening of the farrowing stall which she instinctively fears as animals fear all confined spaces which are blocked at one end and in which they cannot turn around.

More specifically, it is an object to provide a stall having movable sides which can be opened wide at their outer ends with the inner ends more closely spaced apart whereby the walls are inclinedly disposed. When the walls are in these positions the sow will not feel panicky when placed between the walls. The walls are then swung together at their outer ends by the operator and it has been found that the sows do not become alarmed at this. Then the operator places closure means at the rearward end of the stall, locking the sow in. This procedure has been found to save a surprisingly great amount of time because an alarmed sow is very difficult to control.

Still another object is to provide a farrowing stall provided with means for attaching the side walls pivotally to the inner side of the farrowing pen, which latter is often formed by the inner side of an outer wall of the hoghouse. This construction makes it possible to swing the forward ends of the side walls of the stall sideways until they are adjacent the respective side walls of the farrowing pen whereby they can be attached to the side walls of the farrowing pen to fence off the two back corners of the farrowing pen to form two triangular areas to which the pigs can retreat in the period after farrowing by going under the side walls of the stall, the pigs being free to enter the center and forward portion of the pen at will and for access to the sow for feeding. In these triangular areas the pigs are safe from the sow and will not become smothered and killed. With this arrangement the sow has a greater area in which to move about after farrowing whereby the sows are more contented, this being known to have a bearing upon their general health as in human beings.

Yet a further object is to provide means for mounting heating elements on the sidewalls of the stall whereby the elements can be placed over the stall during farrowing and can be adjusted to positions above the triangular areas after farrowing whereby the newborn pigs are protected from the cold to eliminate many unnecessary deaths.

Still another object is to provide a farrowing stall, the side walls of which are attached at their inner ends to the inner wall of the farrowing pen by adjustable means such that the inner ends of the walls can be moved sideways to different desired positions along the inner wall of the pen for adjusting the position of the side walls to sows of different sizes and for adjusting the positions of the walls to regulate the relative sizes of the two triangular areas with respect to the desired size of the center area after farrowing.

Another object is to provide guard means to prevent a farrowing sow from rooting under the side walls of the farrowing stall at the forward end of the side walls as is necessary because sows rooting in this way exert considerable force which could otherwise cause damage to the stall.

Still a further object is to provide a stall as described the side walls of which are attached to anchoring or mounting bars by chains or other suitable means for stabilizing the side walls during farrowing and for attaching the side walls in place for formation of the two triangular areas after farrowing, the latter having the advantage that the same chains or other attachment means are used for both purposes.

Farrowing crates of the prior art have amounted in effect to no more than a box into which the sow is placed during farrowing time so that the sow will not lay on her pigs. Such farrowing crates are awkward and are very heavy. They are extremely difficult to move in and out of a farrowing pen since to be sufficiently strong to prevent a sow from breaking them apart they must be very heavily constructed.

It has been necessary for a full grown man to exert great effort in order to move farrowing crates of the prior art and sometimes this job has required two men. It is therefore an object of this invention to provide a pen formed of panels which can be carried one at a time whereby any unskilled man or any 8 or 10 year old boy can move the farrowing panels from pen to pen as needed.

Still another object of the invention is to provide a farrowing stall made of panels which require very little storage space to eliminate the excessive consumption of storage space which has been a great problem with farrowing crates of the prior art.

Other and further objects and advantages of the present invention will be apparent from the following detailed description, drawings and claims, the scope of the invention not being limited to the drawings themselves as the drawings are only for the purpose of illustrating a way in which the principles of this invention can be applied.

Other embodiments of the invention utilizing the same or equivalent principles may be used and structural changes may be made as desired by those skilled in the art without departing from the present invention and the purview of the appended claims.

Figure 1:
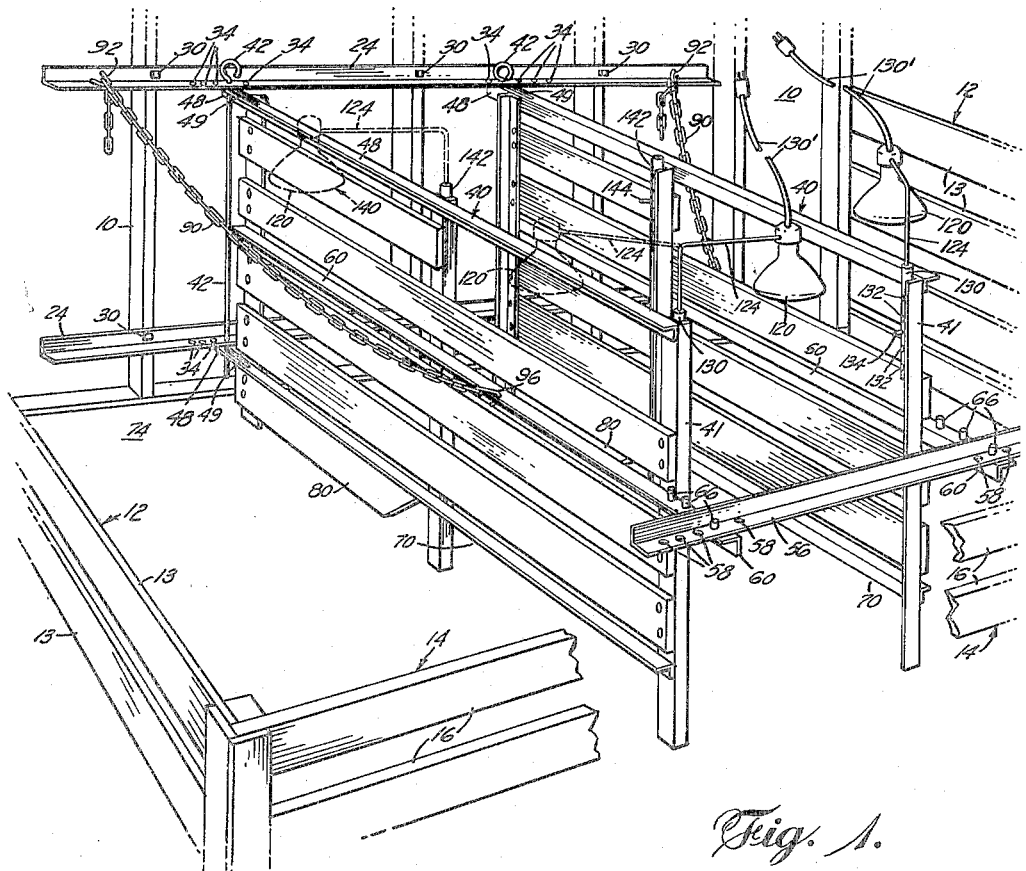
Figure 1 is a perspective view of the pen and stall as a closed or restricted enclosure.

The farrowing stall of this invention is adapted to be disposed in a farrowing pen which latter has an inner or rearward wall 10, side walls 12 formed of rails 13 and a forward wall which is generally indicated at 14 and is illustrated as being formed of rails 16.

The inner or rearward wall 10 of the pen may also be considered a forward wall 10 of a farrowing stall, later described. The inner wall of the pen is also referred to in this specification as the rearward wall of the pen.

While the wall 10 is called the rearward wall of the pen, the reason it is preferred to refer to it at times as the forward wall of a farrowing stall, which is later described, is because the sow in the farrowing stall has its forward end adjacent the wall 10 and further because the wall 10 serves two purposes. Its first purpose is as an inner or rearward wall of the pen, and its second purpose is as a wall of the farrowing stall, later described.

It will be understood that the pen walls 10, 12 and 14 can be made in any suitable manner and that their object is to be tight enough to prevent the escape of both a sow and small newborn pigs.

In accordance with this invention two mounting bars 24 are mounted on the inner or rearward wall 10 by means of anchor bolts 30 or the like. Usually the inner or rearward wall 10 of the pen is formed by the inner sides of an outer wall of a hoghouse.

The anchoring bars 24 are preferably each provided with two rows of horizontally spaced apart apertures 34 extending vertically therethrough, the apertures 34 being disposed in two groups horizontally spaced apart from each other and disposed at the forward ends of the panel side walls 40 which define the farrowing stall of this invention, the side walls 40 having rearward ends 41.

The purpose of the apertures 34 is to receive anchoring pins 42 which latter have large looped upper ends and have downwardly extending elongated shank portions which extend from the apertures in the upper mounting bar 24 downwardly and through the apertures in the lower mounting bar 24.

Figure 2:
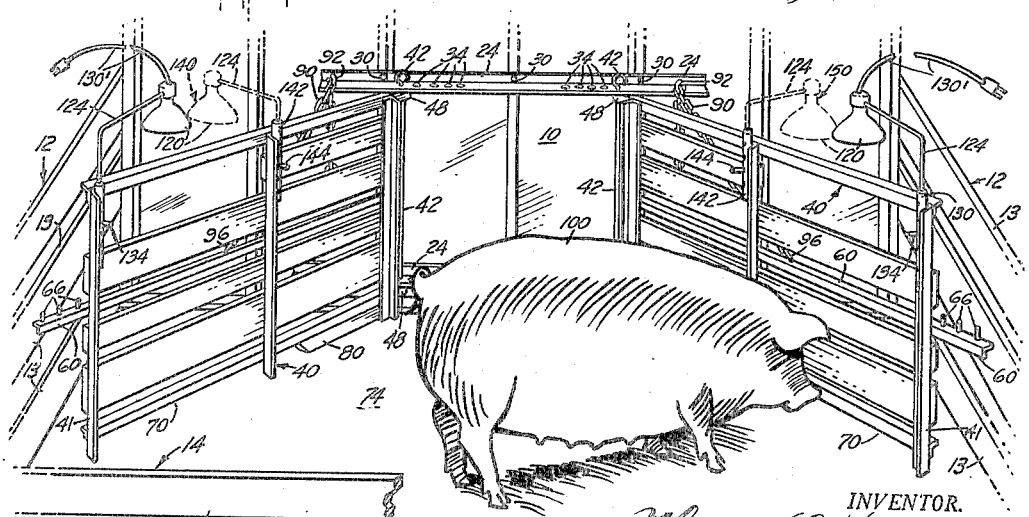
Figure 2 is a perspectcive view of the pen and the stall as an open or non-confining enclosure.

The vertically disposed side walls 40 of the stall are each provided with forwardly extending portions 48, which are best seen in Figure 2. The portions 48 are provided with slots 49 therethrough for receiving the pins 42 and the protruding portions 48 are so disposed as each to be disposed adjacent a respective one of the mounting bars 24, preferably on the undersides thereof. As thus described the pins 42 pivotally mount the vertical side walls 40 in a manner whereby they are free to swing in a horizontal plane.

The slots 49 are disposed in parallelism with the stall side walls or panels so that the rearward ends of the panels can be swung upwardly and downwardly to adjust to different heights of the floor of the pen.

It will be seen that the pins 42, protruding portions 48, and the upper and lower mounting bars 24 form pivotal attachment means located at the forward ends, respectively, of each of the side walls 40 providing hinge-like attachment to the rearward wall 10 of the pen at points on each side wall 40 adjacent the apertures 34 in the upper and lower mounting bars 24. The points of pivoting of each side wall 40 are thus disposed above and below each other respectively for pivotal hinge-like movements of the side walls 40 about substantially vertical axes, which latter are defined, in the example shown in the drawings, by the pins 42.

The side walls 40 are disposed in spaced apart parallelism with each other as shown in Figure 1, at the time of farrowing. In this position they are disposed for snugly receiving a mother sow.

In order to get the sow into position between the side panels 40, as seen in Figure 1, it is best to swing the side wall panels 40 outwardly and into the positions shown in Figure 2. The operator can then cause the sow to enter the pen area between the walls 40. The walls 40 can then be swung toward each other at their rearward ends 41 for reaching the positions shown in Figure 1, with the sow disposed between the side wall panels 40.

The operator now closes the rearward end of the stall. This is done by placing an end closure member 56 across the rearward end of the stall. The member 56 is a bar having a plurality of horizontally spaced apart apertures 58 disposed in two rows, one at each end of the bar 56.

The bar 56 is disposed in a horizontal position resting on the top of two horizontally disposed bar members 60 which latter extend outwardly from the rearward ends of the side walls 40 and are secured to the side walls 40 in a rigid manner. The bars 60 have pegs 66 extending upwardly therefrom for disposal through the apertures 58 and the pegs 66 are spaced apart with respect to each other from forward to rearward along the rearwardly protruding portions of the bars 60 whereby the closure member 56 can be placed on the rearward pegs 66 or on pegs 66 which are more forwardly disposed for regulating the position of the end closure bar 56 to the length of the sow.

It will be understood that many substitutes can be substituted for the specific end closure member 56 and its adjustment means and that it is only its broad aspects which are of primary interest here.

The side walls 40 are provided with open spaces 70 under their rearward ends and between the rearward ends of the undermost portions of the sides 40 and the floor 74 of the farrowing pen. The open spaces 70 make it possible for newborn pigs to escape therethrough outwardly of the stall at times when the mother sow is about to lie down upon them.

When a sow lies down in the farrowing stall she tends to lay against one of the side wall panels 40 and then to slide downwardly along the panel. This action tends to push the baby pigs outwardly through the opening 70, whereby they do not become killed.

At the forward ends of the side wall panels 40, the side walls are provided on their undersides with closure plates 80 which extend downwardly adjacent the floor 74 so as to prevent the sow from rooting under the forward end of the side walls 40 to prevent the sow from damaging the stall.

The side walls 40 of the stall are braced by chains 90 which extend downwardly from the outer ends of the upper bar 24 to which they are anchored by a hook 92 or other suitable means, extending downwardly to any suitable part of the side walls 40 such as the members 60. The chains 90 are secured to the members 60 by suitable anchor members 96 which are attached to the members 60.

It will be understood that other means can be substituted for the chains 90, but that the chains 90 are particularly well adapted because the links thereof can be hooked upon the hooks 92 at any position desired.

As best seen in Figure 2, the chain 90 serves to hold the side wall 40 in the inclinedly disposed positions shown in Figure 2, as later described.

The sow is shown in Figure 2 at 100. After farrowing the sow 100 should be permitted more freedom and for this reason the rear end closure member 56 is removed and the side walls 40 are pivotally swung outwardly on the wall 10 into positions shown in Figure 2 whereby the walls 40 tend to fence off triangular shaped corners at the rearward ends 41 of the pen where the pigs can be safe from being laid down on by the sow.

It will be seen that the pigs can run through the openings 70 freely at times when the side walls 40 are in the position shown in Figure 2.

The side walls 40 have been shown in Figure 2 in positions such that their forward ends are farther spaced apart than in Figure 1. It is not necessary to move the forward ends of the side walls 40 to different positions than in Figure 1 in order to form the two triangular areas. However, this can be done if desired in order to create more room at the center of the pen at the expansion space in the two triangular areas for the pigs.

In accordance with this invention, heat elements, shown at 120, are positioned near the rearward end of the stall and are mounted on the side walls 40 by means now to be described. Each element 120 has a socket mounted on brackets 124 of right angle shape, the upper portions of the brackets 124 extending horizontally and the lower portions of the brackets 124 extending vertically, the latter being received in any suitable holder such as pipes 130 secured to the side panels.

The pipes 130 are provided with a plurality of vertically spaced apart apertures 132 into which pins can be disposed for extending beneath the lower ends of the vertical portions of the mounting brackets 124 in order to adjustably support the brackets 124 at any desired vertical position, while permitting the elements 120 to be swung in a horizontal arc. Both pins can be seen in Figure 2 at 134.

The elements 120 are provided with cords 130' which can be of any suitable length for connection to another cord or electrical supply source, not shown.

As best seen in Figure 2, the element 120 can be swung to the outer and forward sides of the wall panels 40 above the triangular areas for heating the triangular areas after farrowing.

Other elements can be added, if desired. Another element position is shown in dotted lines in Figure 1 at 140, the latter having a similar holder 142 and pin 144.

In Figure 2 the element 140 is shown again in dotted lines and a similar element 150 is shown in dotted lines on the opposite side wall panel 40. It will be understood that the lamp 140 and element 150 are necessary only when the cold is extreme.

This is believed to fully describe the farrowing stall of my invention and I believe it to be the most practical device for satisfying the needs of the pig raisers before and after farrowing.

From the foregoing description, it is thought to be obvious that a farrowing stall constructed in accordance with my invention is particularly well adapted for use, by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice, except as claimed.

I claim:

1. In combination: a farrowing pen having a floor, forward wall, side walls, and a rearward wall; two mounting bars mounted on said rearward wall and having portions protruding outwardly therefrom, said bars each being disposed in spaced apart parallelism with each other and being horizontally disposed one above the other, each of said bars having a plurality of horizontally spaced apart apertures extending vertically therethrough hooks secured to each end of said upper mounting bar; two farrowing stall side walls disposed upright in spaced apart vertical planes for receiving a sow therebetween, said side walls being disposed in said pen and on the floor of said pen with their forward ends adjacent said rearward pen wall and disposed inwardly from the ends of said bars during farrowing whereby the outer ends of said bars project beyond said walls respectively, said farrowing stall sidewalls having rearwardly protruding portions being provided with slots respectively therethrough disposed longitudinally with respect to said stall side walls to make possible an upward swinging of the rearward ends of said sidewalls to adjust to variable heights of pen floor; two pivot pins disposed through slots in respective ones of said protruding portions and through selected ones of the apertures through said mounting bars whereby said stall sidewalls are pivotally mounted at their inner ends on said mounting bars whereby their outer ends are free to be swung horizontally about said pins; chains secured to said stall sidewalls and engageably on said hooks for adjustably attaching the said portions of said stall sidewalls to the outer ends of said end portions of said upper mounting bar which extends outwardly and to the side from said stall side walls whereby said side walls can be held in different selected positions with respect to said mounting bar; said side walls having open portions under their rearward ends whereby farrowed pigs can pass backward and forward through said open portions at will and to escape being killed and smothered by being lain on by the mother sow, the forward portions of the under sides of said stall side walls being closed to prevent a sow between said sidewalls from rooting under the stall side walls; a closure member for the rear end of said stall; means for removably attaching said rear end closure member to the rearward ends of said side walls of said stall in an adjustable manner whereby said rear end closure member and said attachment means cooperate to hold the rearward ends of said stall side walls in selected spaced apart positions for adaptation to different widths of sows, the construction being such that the rearward ends of said stall side walls can be pivotally swung to the side and adjacent to the sidewalls of said pen when said closure member has been disengaged from said stall sidewalls for fencing off two triangular areas in the rear corners of said farrowing pen in which pigs are safe from being lain on by the sow after farrowing, and the plurality of horizontally spaced apart apertures in said mounting bar permitting adjustment of said rearward ends of said stall side walls lengthways of said mounting bar for providing the stall with an adjustable width, and the said adjustable stall sidewall attaching chains being adapted to be adjusted to positions for holding said sidewalls in the positions for fencing off said two triangular areas.

2. A farrowing stall and farrowing pen combination as described in claim 1 in which said stall side walls are provided with at least one heat element; and means for adjustably mounting said heat element on one of said side walls in a way such that said heat element can be disposed above said farrowing stall during farrowing and can be disposed above one of said triangular areas after farrowing.

3. In combination: a farrowing pen having a floor, a forward wall, side walls, and a rearward wall; two farrowing stall side walls disposed upright in spaced apart vertical planes for receiving a sow therebetween, said side walls being disposed in said pen and on the floor of said pen with their forward ends adjacent said rearward pen wall; pivotal attachment means located at the forward ends, respectively, of said side walls providing hinge-like attachment to said rearward wall of said pen at points on each side wall disposed below and above each other respectively for pivotal hinge-like movements of said side walls about substantially vertical axes for attaching the forward ends of said side walls to said rearward wall of said pen in a manner such that said stall side walls are free to swing pivotally and horizontally about their forward ends whereby said stall side walls can be placed in spaced apart parallelism with each other for receiving a sow therebetween during farrowing and whereby said stall side walls can be inclinedly disposed with respect to each other after farrowing with their rearward ends spaced apart farther than their forward ends, the construction being such that the rearward ends of said stall side walls can be pivotally swung to the side and adjacent to the side walls of said pen for fencing off two triangular areas in the rear corners of said farrowing pen in which pigs are safe from being lain on by the sow after farrowing; a rear end closure member removably disposable across the rear ends of said stall side walls; means for removably attaching said rear end closure member to said rearward ends of said stall side walls for holding a farrowing sow in said stall during farrowing and for permitting removal of said rear end closure member after farrowing for the fencing off of said triangular areas; and means for removably attaching said stall side walls to said pen to hold said stall side walls in said positions for forming said two triangular areas.

4. The article of manufacture described in claim 3 which further includes at least one heat element; and means for attaching said heat element to one of said side walls in an adjustable manner whereby said heat element can be disposed above said farrowing stall during farrowing and can be disposed above one of said triangular areas.

5. A claim as described in claim 3 in which said stall side walls are provided with open spaces under the rearward ends thereof for the free entry and escape of newborn pigs from the farrowing stall.

6. A farrowing stall as described in claim 3 in which the forward ends of the under sides of said stall side walls are closed sufficiently to prevent sows from rooting under side walls.

7. For use with a farrowing pen having a floor, forward wall, side walls, and a rearward wall; the invention which comprises; two mounting bars for mounting on said rearward wall and having portions protruding outwardly therefrom, said bars each being disposed in substantially spaced apart parallelism with each other and being substantially horizontally disposed and spaced one above the other, each of said bars having a plurality of horizontally spaced apart apertures extending vertically therethrough hooks secured to each end of said upper mounting bar; two farrowing stall side walls disposed upright in spaced apart vertical planes for receiving a sow therebetween, said side walls being disposable in said pen and on the floor of said pen with their forward ends adjacent said rearward pen wall and disposable in positions inwardly from the ends of said bars during farrowing whereby the outer ends of said bars project horizontally beyond said walls respectively, said farrowing stall sidewalls having rearwardly protruding portions being provided with slots respectively therethrough disposed longitudinally with respect to said stall side walls to make possible an upward swinging of the rearward ends of said side walls to adjust to variable heights of pen floors; two pivot pins disposed through slots in respective ones of said protruding portions and through selected ones of the apertures through said mounting bars whereby said stall side walls are pivotally mounted at their inner ends of said mounting bars whereby their outer ends are free to be swung horizontally about said pins; adjustable means for attaching the said portions of said upper mounting bar which extends outwardly and to the side from said stall side walls to said stall side-walls whereby the outer ends of said side walls can be held in different selected positions with respect to said mounting bar; said side walls having open portions under their rearward ends whereby farrowed pigs can pass backward and forward through said open portions at will and to escape being killed and smothered by being lain on by the mother sow, the forward portions of the under sides of said stall side walls being closed to prevent a sow between said sidewalls from rooting under the stall side walls; a closure member for the rear end of said stall; means for removably attaching said rear end closure member to the rearward ends of said side walls of said stall in an adjustable manner whereby said rear end closure member and said attachment means cooperate to hold the rearward ends of said stall side walls in selected spaced apart positions for adaptation to different widths of sows, the construction being such that the rearward ends of said stall side walls can be pivotally swung to the side and adjacent to the sidewalls of said pen when said closure member has been disengaged from said stall sidewalls for fencing off two triangular areas in the rear corners of said farrow pen in which pigs are safe from being lain on by the sow after farrowing, and the plurality of horizontally spaced apart apertures in said mounting bar permitting adjustment of said rearward ends of said stall side walls lengthways of said mounting bar for providing the stall with an adjustable width, and the said adjustable stall sidewall attaching chains being adapted to be adjusted to positions for holding said sidewalls in the positions for fencing off said two triangular areas.

8. For use with a farrowing pen having a floor, forward wall, side walls, and a rearward wall; two farrowing stall side walls disposed upright in spaced apart vertical planes for receiving a sow therebetween, said side walls being disposed in said pen and on the floor of said pen with their forward ends adjacent said rearward pen wall; means for attaching the forward ends of said side walls to said rearward wall of said pen in a manner such that said stall side walls are free to swing pivotally and horizontally about their forward ends whereby said stall side walls can be placed in spaced apart parallelism with each other for receiving a sow therebetween during farrowing and whereby said stall side walls can be inclinedly disposed with respect to each other after farrowing with their rearward ends spaced apart farther than their forward ends, the construction being such that the rearward ends of said stall side walls can be pivotally swung to the side and adjacent to the side walls of said pen for fencing off two triangular areas in the rear corners of said farrowing pen in which pigs are safe from being lain on by the sow after farrowing; a rear end closure member removably disposable across the rear ends of said stall side walls; means for removably attaching said rear end closure member to said rearward ends of said stall side walls for holding a farrowing sow in said stall during farrowing and for permitting removal of said rear end closure member after farrowing for the fencing off of said triangular areas; and means for removably attaching said stall side walls to said pen to hold said stall side walls in said positions for forming said two triangular areas.

9. The construction described in claim 7 in which said stall side walls are provided with open spaces under the rearward end thereof for the free entry and escape of newborn pigs from the farrowing stall.

10. A farrowing stall as described in claim 7 in which the forward ends of the undersides of said stall side walls are closed sufficiently to prevent sows from rooting under said side walls.

11. For use with a farrowing pen having a floor, a forward wall and two side walls, the following: two farrowing stall side walls disposed upright in spaced apart vertical planes for receiving a sow therebetween, said side walls being disposed in said pen and adjacent the floor of said pen with their forward ends adjacent the rearward wall of said pen; and means for attaching the forward ends of said side walls to said rearward wall of said pen in a manner such that said stall side walls are free to swing pivotally and horizontally about their forward ends whereby said stall side walls can be placed in spaced apart parallelism with each other for receiving a sow therebetween during farrowing and whereby said stall side walls can be inclinedly disposed with respect to each other after farrowing with their rearward ends spaced apart farther than their forward ends.

12. In combination: a farrowing pen having a floor, forward wall, side walls, and a rearward wall; two farrowing stall side walls disposed upright in spaced apart vertical planes for receiving a sow therebetween, said side walls being disposed in said pen and on the floor of said pen with their forward ends adjacent said rearward pen wall; pivotal attachment means located at the forward ends, respectively, of said side walls providing pivotal attachment to said rearward wall of said pen for attaching the forward ends of said side walls to said rearward wall of said pen in a manner such that said stall side walls are free to swing pivotally and horizontally about their forward ends whereby said stall side walls can be placed in spaced apart parallelism with each other for receiving a sow therebetween during farrowing and whereby said stall side walls can be inclinedly disposed with respect to each other with their rearward ends spaced apart farther than their forward ends, the construction being such that the rearward ends of said stall side walls can first be pivotally swung outwardly into positions for receiving a sow without alarming the sow and such that said side walls can thereafter be swung inwardly to positions for confinement of the sow, a rearward end closure member removably disposable across the rearward ends of said stall side walls, means for removably attaching said rear end closure member to said rearward ends of said stall side walls for holding a farrowing sow in said stall during farrowing and for permitting removal of said rear end closure member after farrowing, means for maintaining said side walls substantially upright.

13. A stall for confining a sow comprising; a forward wall, two side walls disposed upright and in spaced apart vertical planes for receiving a sow therebetween, forward ends of said side walls being disposed adjacent said forward wall; pivotal attachment means located at the forward ends, respectively, of said side walls providing pivotal attachment to said rearward wall of said pen for attaching the forward ends of said side walls to said forward wall of said stall in a manner such that said side walls are free to swing pivotally and horizontally about their forward ends whereby said stall side walls can be placed in spaced apart parallelism with each other for receiving a sow therebetween and whereby said stall side walls can be inclinedly disposed with respect to each other with their rearward ends spaced apart farther than their forward ends, the construction being such that the rearward ends of said stall side walls can first be pivotally swung outwardly into positions for receiving a sow without alarming the sow and such that said side walls can thereafter be swung inwardly to positions for confinement of the sow, a rear end closeure member removably disposable across the rearward ends of said stall side walls; and means for removably attaching said rear closure member to said rearward ends of said stall side walls for holding a sow in said stall and for permitting removal of said rear end closure member, means for maintaining said side walls substantially upright.

References Cited in the file of this patent

UNITED STATES PATENTS

| 488,739 | Osborn et al. | Dec. 27, 1892 |
| 1,168,836 | Vette | Jan. 18, 1916 |
| 2,392,792 | Whitehouse et al. | Jan. 8, 1946 |
| 2,610,830 | Beatty | Sept. 16, 1952 |